United States Patent
Suzuki et al.

(10) Patent No.: US 12,122,300 B2
(45) Date of Patent: Oct. 22, 2024

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Ko Sato, Kanagawa (JP); Daisuke Tanaka, Kanagawa (JP); Yasuhiro Sakurai, Kanagawa (JP); Ryota Yamanaka, Kanagawa (JP); Junya Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/627,129

(22) PCT Filed: Jul. 7, 2017

(86) PCT No.: PCT/JP2017/025003
§ 371 (c)(1),
(2) Date: Dec. 27, 2019

(87) PCT Pub. No.: WO2019/008759
PCT Pub. Date: Jan. 10, 2019

(65) Prior Publication Data
US 2020/0180510 A1 Jun. 11, 2020

(51) Int. Cl.
*B60R 1/27* (2022.01)
*G08G 1/14* (2006.01)
(Continued)

(52) U.S. Cl.
CPC ............... *B60R 1/27* (2022.01); *G08G 1/143* (2013.01); *H04N 23/698* (2023.01); *B60R 2300/806* (2013.01); *H04N 23/90* (2023.01)

(58) Field of Classification Search
CPC .... B60R 1/00; B60R 2300/806; B60W 50/14; B60W 2420/42; B60W 2050/146; B60T 2201/01
See application file for complete search history.

(56) References Cited

U.S. PATENT DOCUMENTS

| | | | |
|---|---|---|---|
| 6,340,935 B1 * | 1/2002 | Hall | G07B 15/04 340/932.2 |
| 10,163,016 B2 | 12/2018 | Hayakawa | |

(Continued)

FOREIGN PATENT DOCUMENTS

| | | |
|---|---|---|
| CA | 3002636 A1 | 4/2017 |
| EP | 2583869 A1 | 4/2013 |

(Continued)

*Primary Examiner* — Clifford Hilaire
(74) *Attorney, Agent, or Firm* — Young Basile Hanlon & MacFarlane, P.C.

(57) ABSTRACT

A parking assistance device includes: a sensor-information processing circuit that detects an empty parking space around a host vehicle; a surrounding-image generation circuit that generates a surrounding image that is a view of surroundings of the host vehicle from above; an image display circuit that displays a first assistance image at a position of the empty parking space in the surrounding image, the first assistance image indicating the empty parking space; and a stop determination circuit that determines whether the host vehicle has stopped. In a case where it is determined by the stop determination circuit that the host vehicle has stopped, the image display circuit displays the first assistance image.

18 Claims, 5 Drawing Sheets

(51) Int. Cl.
*H04N 23/698* (2023.01)
*H04N 23/90* (2023.01)

(56) References Cited

U.S. PATENT DOCUMENTS

| | | | |
|---|---|---|---|
| 10,366,611 | B2 | 7/2019 | Hayakawa |
| 2003/0165255 | A1* | 9/2003 | Yanagawa ................. G06T 3/00 |
| | | | 382/104 |
| 2003/0197660 | A1* | 10/2003 | Takahashi .......... G06K 9/00791 |
| | | | 345/7 |
| 2004/0260439 | A1* | 12/2004 | Endo ........................ B60Q 1/48 |
| | | | 348/148 |
| 2005/0173523 | A1* | 8/2005 | Yushio ................... G06Q 40/02 |
| | | | 235/384 |
| 2007/0119647 | A1* | 5/2007 | Kusunoki ............ B60N 2/0252 |
| | | | 180/326 |
| 2007/0146165 | A1* | 6/2007 | Tanaka ............... B62D 15/0285 |
| | | | 340/932.2 |
| 2010/0089677 | A1* | 4/2010 | Tanaka ................. B62D 15/027 |
| | | | 180/204 |
| 2013/0060421 | A1* | 3/2013 | Kadowaki ................. B60R 1/00 |
| | | | 701/36 |
| 2014/0247352 | A1* | 9/2014 | Rathi ...................... G06V 20/56 |
| | | | 348/148 |
| 2015/0379873 | A1* | 12/2015 | Tippelhofer ........... G08G 1/143 |
| | | | 340/932.2 |
| 2016/0078763 | A1 | 3/2016 | Kiyokawa et al. |
| 2016/0236680 | A1* | 8/2016 | Lavoie .................. B60W 30/06 |
| 2017/0096167 | A1* | 4/2017 | Yoon .................... B62D 15/028 |
| 2018/0037262 | A1 | 2/2018 | Imai |
| 2018/0308358 | A1 | 10/2018 | Hayakawa |
| 2018/0322349 | A1 | 11/2018 | Hayakawa |
| 2020/0148263 | A1 | 5/2020 | Imai |

FOREIGN PATENT DOCUMENTS

| | | |
|---|---|---|
| JP | 2007-176244 A | 7/2007 |
| JP | 2008-096362 A | 4/2008 |
| JP | 2012-001144 A | 1/2012 |
| JP | 2014-125195 A | 7/2014 |
| JP | 2016185745 A | 10/2016 |
| JP | 2016215691 A | 12/2016 |
| KR | 2014-0144906 A | 12/2014 |
| KR | 20150051782 A | 5/2015 |
| WO | 2017/068696 A1 | 4/2017 |
| WO | 2017/068701 A1 | 4/2017 |

\* cited by examiner

PARKING ASSISTANCE METHOD AND PARKING ASSISTANCE DEVICE

TECHNICAL FIELD

The present invention relates to parking assistance methods and parking assistance devices.

BACKGROUND

There have been known inventions for assisting parking operation of the occupant (Japanese Patent Application Publication No. 2008-96362). In the invention disclosed in Japanese Patent Application Publication No. 2008-96362, an empty parking space is searched for while the vehicle is traveling. In the case where an empty parking space is detected, an image indicating the empty parking space is displayed on a display.

SUMMARY

Unfortunately, in the case where an image indicating an empty parking space is displayed while the vehicle is travelling, as in the invention disclosed in Japanese Patent Application Publication No. 2008-96362, the image may not be displayed at an appropriate position because of processing delay or other factors.

The present invention has been made in light of the above problem, and an object thereof is to provide a parking assistance method and parking assistance device capable of displaying an image indicating an empty parking space, at an appropriate position.

A parking assistance method according to an aspect of the present invention includes: determining whether a host vehicle has stopped; and in a case where it is determined that the host vehicle has stopped, displaying an image at a position of an empty parking space in a surrounding image that is a view of an area including the host vehicle from above, the image indicating the empty parking space.

The present invention makes it possible to display an image indicating an empty parking space, at an appropriate position.

DETAILED DESCRIPTION

Figure 1:
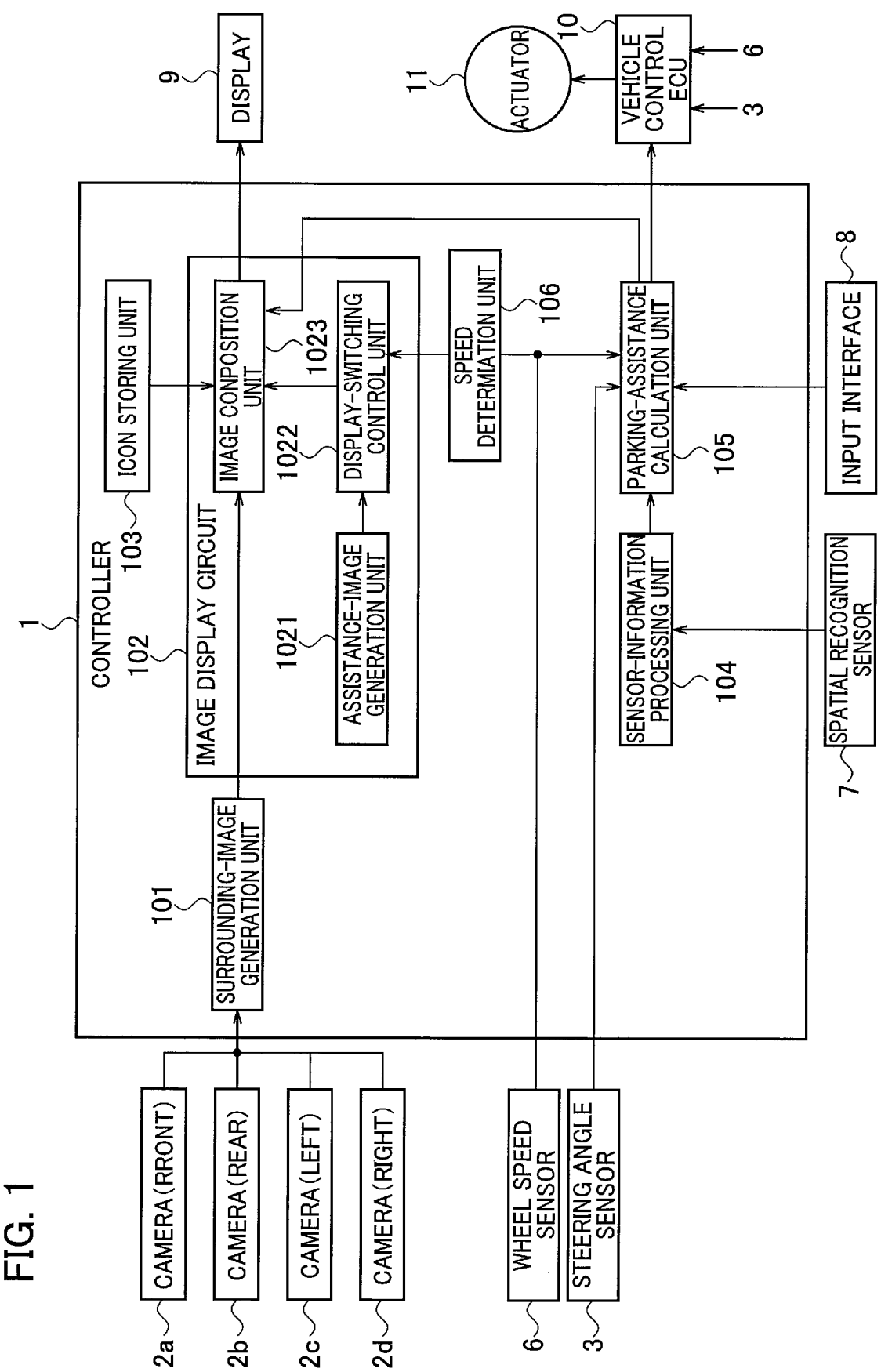
FIG. 1 is an overall configuration diagram a parking assistance device according to an embodiment of the present invention.

Hereinafter, an embodiment of the present invention will be described with reference to the drawings. The same constituents in the drawings are denoted by the same symbols, and description thereof is omitted. A parking assistance device according to the present embodiment is applied to a vehicle in which its driving mode can be switched between automated driving and manual driving. Note that automated driving in the present embodiment means, for example, the state where at least one of the actuators including the brakes, accelerator, and steering is being controlled without operation by the occupant. It means that the other actuators may be being operated by the occupant. The automated driving also means the state where at least one kind of control such as acceleration-deceleration control or lateral position control is being executed. Manual driving in the present embodiment means, for example, the state where the occupant is operating the brakes, accelerator, and steering. Note that the embodiment of the present invention can be applied to both automated driving and manual driving. In addition, the embodiment of the present invention can be applied to any case of traveling in a parking lot having parking spaces, including when detecting an empty parking space, when having detected an empty parking space, when parking in (moving to) an empty parking space, when traveling near an empty parking space, and when traveling in a parking lot although there is no empty parking space.

(Configuration of Parking Assistance Device)

The configuration of a parking assistance device according to the present embodiment will be described with reference to FIG. 1. The parking assistance device includes a controller 1, cameras 2a to 2d, a steering angle sensor 3, a wheel speed sensor 6, a spatial recognition sensor 7, an input interface 8, a display 9, a vehicle control ECU10, and an actuator 11.

The cameras 2a to 2d each have an image capturing device, such as a charge-coupled device (CCD) or a complementary metal oxide semiconductor (CMOS) and capture images around the host vehicle. The camera 2a is mounted at a front portion of the host vehicle to capture images ahead of the host vehicle. The camera 2b is mounted at a rear portion of the host vehicle to capture images behind the host vehicle. The camera 2c is mounted at a left side of the host vehicle to capture images on the left side of the host vehicle. The camera 2d is mounted at a right side of the host vehicle to capture images on the right side of the host vehicle. The cameras 2a to 2d output captured images to the controller 1. Note that the cameras 2a to 2d capture images of the surroundings of the host vehicle and do not capture the host vehicle itself. Hence, when an image composition unit 1023 described later displays a downward view image, the image composition unit 1023 uses an icon (an image imitating the host vehicle) stored in an icon storing unit 103.

The steering angle sensor 3 detects the steering angle of the host vehicle and outputs the detected steering angle to the controller 1. The wheel speed sensor 6 detects the speed of the host vehicle and outputs the detected speed to a speed determination unit 106.

The spatial recognition sensor 7 is a sensor for detecting objects around the host vehicle, which is, for example, a laser range finder. The laser range finder projects infrared laser light toward a target object and measures the distance to the target object using the intensity of the reflected light. The laser range finder obtains the measured distance as point cloud information and outputs the point cloud information to a sensor-information processing unit 104. Objects around the host vehicle mean moving objects including other vehicles, motorbikes, bicycles, and pedestrians and stationary objects including parked vehicles. Note that the spatial recognition sensor 7 is not limited to a laser range finder. The spatial recognition sensor 7 only needs to detect the distance to a target object and the presence of the target object, and hence the spatial recognition sensor 7 may be, for example, a clearance sonar utilizing ultrasonic, a monocular camera, or a stereo camera having a pair of cameras.

The input interface 8 is a device that receives input from the occupant of the host vehicle. The input interface 8 is, for example, a touch panel provided on the display 9. Note that the input interface 8 may be a joystick or an operation switch or may be a voice input device.

The controller 1 is circuitry that processes data obtained from various sensors and is, for example, a general-purpose microcomputer including a central processing unit (CPU), memory, and an input-output unit. A computer program that causes the microcomputer to function as the controller 1 is installed in and executed by the microcomputer. This makes the microcomputer function as the controller 1. Note that although here, description is made of an example in which the controller 1 is implemented by software, dedicated hardware for executing information processes described below, as a matter of course, may be used to configure the controller 1. The controller 1 includes multiple information process circuits, which are a surrounding-image generation unit 101, a composite-image generation unit 102, the icon storing unit 103, the sensor-information processing unit 104, a parking-assistance calculation unit 105, and the speed determination unit 106. The composite-image generation unit 102 includes an assistance-image generation unit 1021, a display-switching control unit 1022, and the image composition unit 1023.

The surrounding-image generation unit 101 (surrounding-image generation circuit) generates a downward view image (surrounding image) which is a view of the host vehicle from above, using images captured by the four cameras 2a to 2d. Note that the surrounding image may be any form from which the positional relationship between the host vehicle and the parking spaces can be seen, such as a downward view image and a bird's view image. In addition, since how to generate the downward view image or the bird's view image is a known technique, detailed description thereof is omitted.

The sensor-information processing unit 104 (sensor-information processing circuit) estimates a travel path along which the host vehicle is to travel, using information obtained from the spatial recognition sensor 7. The sensor-information processing unit 104 estimates a parking area (parking spot) in the vicinities of the estimated travel path. The sensor-information processing unit 104 detects empty parking spaces around the host vehicle. The sensor-information processing unit 104 estimates the range in which the host vehicle can travel based on the estimated travel path and parking spots. The sensor-information processing unit 104 may detect parking spots using white lines on the ground.

The speed determination unit 106 (stop determination circuit) determines the speed of the host vehicle, using the speed obtained from the wheel speed sensor 6. The speed determination unit 106 outputs the determination result to the display-switching control unit 1022.

The assistance-image generation unit 1021 generates assistance images for assisting parking. Note that the assistance images may be stored in the icon storing unit 103 in advance. In the case where the assistance images are stored in the icon storing unit 103, the assistance-image generation unit 1021 can read the assistance images from the icon storing unit 103. The assistance-image generation unit 1021 outputs the generated assistance images to the display-switching control unit 1022.

The display-switching control unit 1022 determines whether to output assistance images obtained from the assistance-image generation unit 1021 to the image composition unit 1023, depending on the determination result by the speed determination unit 106. For example, in the case where the speed of the host vehicle is 0 km/h, the display-switching control unit 1022 outputs an assistance image to the image composition unit 1023. Details will be described later.

The image composition unit 1023 (image display circuit) superimposes the icon (the image imitating the host vehicle) obtained from the icon storing unit 103 on the surrounding image generated by the surrounding-image generation unit 101 to make a composite image. In the case where the image composition unit 1023 obtains the assistance image from the display-switching control unit 1022, the image composition unit 1023 superimposes the assistance image on the surrounding image. The image composition unit 1023 outputs the composed image to the display 9.

The parking-assistance calculation unit 105 calculates a control signal for the host vehicle based on information inputted to the input interface 8, data obtained by the sensor-information processing unit 104, the steering angle detected by the steering angle sensor 3, and the vehicle speed detected by the wheel speed sensor 6. The parking-assistance calculation unit 105 outputs the calculated control signal to the vehicle control ECU10.

The vehicle control ECU10 automatically controls driving of the actuator 11 on driving, braking, and steering the host vehicle, based on the control signal and the like obtained from the parking-assistance calculation unit 105.

The display 9 is a device for displaying various kinds of information for the occupant, which is, for example, a display for navigation provided in the passenger compartment.

Figure 2:
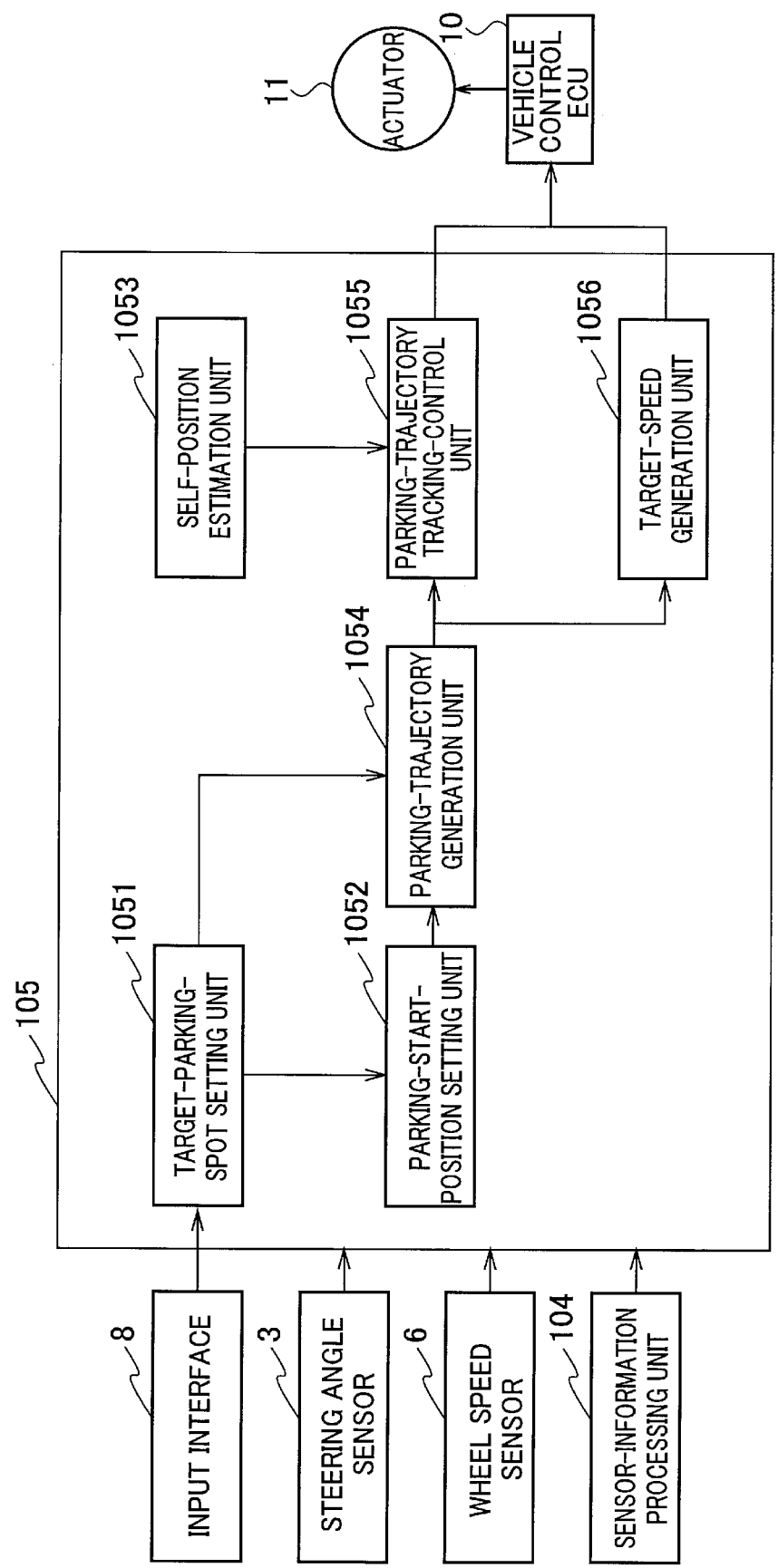
FIG. 2 is a configuration diagram of part of the parking assistance device according to the embodiment of the present invention.

Next, the parking-assistance calculation unit 105 will be described in detail with reference to FIG. 2. As illustrated in FIG. 2, the parking-assistance calculation unit 105 includes a target-parking-spot setting unit 1051, parking-start-position setting unit 1052, self-position estimation unit 1053, parking-trajectory generation unit 1054, parking-trajectory tracking-control unit 1055, and target-speed generation unit 1056.

The target-parking-spot setting unit 1051 sets the target parking position to a parking position that the occupant input to the input interface 8. The target-parking-spot setting unit 1051 outputs the set target parking position to the parking-start-position setting unit 1052 and the parking-trajectory generation unit 1054.

The parking-start-position setting unit 1052 determines a parking method suitable for parking at the target parking position and sets a parking start position suitable for the determined parking method. Examples of the parking method include parallel parking and perpendicular parking, and reverse parking and forward parking. The parking-start-position setting unit 1052 outputs the set parking start position to the parking-trajectory generation unit 1054.

The self-position estimation unit 1053 estimates the current position of the host vehicle, based on detection data and the like of the wheel speed sensor 6 and steering angle sensor 3. For a front-wheel-steering vehicle traveling at a low speed, it is common to use a dead reckoning approach in which the position and orientation of the host vehicle are estimated based on the relationship between the travel distance of the center of the rear wheel axle and the front-wheel steering angle. The dead reckoning approach is useful for the case of considering traveling in a limited section such as parking operation. As another example, the self-position estimation unit 1053 can also estimate the self-position based on the positional relationship of the host vehicle relative to detection data detected by the spatial recognition sensor 7, the positional relationship of the host vehicle relative to white lines on the ground captured by the cameras 2a to 2d and object recognition results, or the like. Alternatively, the self-position estimation unit 1053 may estimate the absolute position of the host vehicle, in other words, the position of the host vehicle relative to a specified reference point, using a position detection sensor. The position detection sensor is a device mounted on the host vehicle for measuring the absolute position of the host vehicle using a global positioning system (GPS), odometry, or the like. The self-position estimation unit 1053 outputs the estimated self-position to the parking-trajectory tracking-control unit 1055.

The parking-trajectory generation unit 1054 generates a parking trajectory from the parking start position set by the parking-start-position setting unit 1052 to the target parking position. The parking-trajectory generation unit 1054 generates a parking trajectory, for example, such that the number of forward and backward movements and the amount of steering are minimized, so that the occupant does not feel discomfort. The parking-trajectory generation unit 1054 outputs the generated parking trajectory to the parking-trajectory tracking-control unit 1055 and the target-speed generation unit 1056.

The parking-trajectory tracking-control unit 1055 generates a control signal for performing automatic parking control along the parking trajectory, based on the parking trajectory generated by the parking-trajectory generation unit 1054 and the self-position estimated by the self-position estimation unit 1053. For example, the parking-trajectory tracking-control unit 1055 generates a control signal related to the steering angle and the shift position. The parking-trajectory tracking-control unit 1055 outputs the generated control signal to the vehicle control ECU10.

The target-speed generation unit 1056 generates a control signal for performing automatic parking control along the parking trajectory generated by the parking-trajectory generation unit 1054. For example, the target-speed generation unit 1056 generates a control signal related to the speed (the amount of acceleration and the amount of braking). The target-speed generation unit 1056 outputs the generated control signal to the vehicle control ECU10.

The vehicle control ECU10 controls the actuator 11 based on the control signals generated by the parking-trajectory tracking-control unit 1055 and the target-speed generation unit 1056 to achieve automatic parking control.

(Operation Example of Parking Assistance Device)

Next, an operation example of a parking assistance device will be described with reference to surrounding images 20 illustrated in FIGS. 3A and 3B.

Figure 3A:
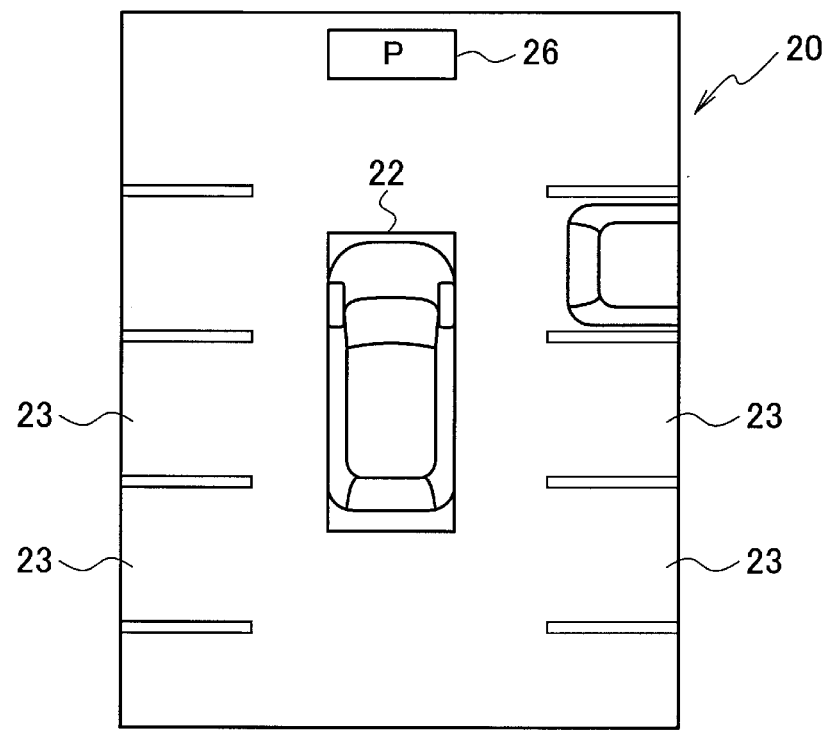
FIG. 3A is a diagram for explaining an operation example of the parking assistance device according to the embodiment of the present invention.

The scene illustrated in FIG. 3A is a scene in which the host vehicle 22 is traveling in a parking lot while detecting an empty parking space. In the scene illustrated in FIG. 3A, it is assumed that the speed of the host vehicle 22 is more than 0 km/h. The scene illustrated in FIG. 3B is also a scene of detecting an empty parking space, and in the scene illustrated in FIG. 3B, it is assumed that the speed of the host vehicle 22 is 0 km/h.

In the case where the sensor-information processing unit 104 detects empty parking spaces 23 as a result of detecting empty parking spaces around the host vehicle 22 as illustrated in FIG. 3A, the speed determination unit 106 determines whether the host vehicle 22 is traveling. Specifically, in the case where the speed determination unit 106 determines whether the speed of the host vehicle 22 is more than 0 km/h and determines that the speed of the host vehicle 22 is more than 0 km/h, the speed determination unit 106 determines that the host vehicle 22 is traveling.

In the case where the speed determination unit 106 determines that the host vehicle 22 is traveling, the image composition unit 1023 superimposes an assistance image 26 (the second assistance image) on the surrounding image 20 as illustrated in FIG. 3A. Then, the image composition unit 1023 displays the composite image with the assistance image 26 superimposed, on the display 9. The assistance image 26 is an image indicating an empty parking space 23 is detected around the host vehicle 22. The assistance image 26 is not an image showing the empty parking space 23 itself. Hence, the assistance image 26 is superimposed at a fixed position different from the position of the empty parking space 23. For example, in the present embodiment, the assistance image 26 is superimposed at an upper center of the surrounding image 20.

Since the assistance image 26 is displayed at a position different from the empty parking space 23 as described above while the host vehicle 22 is traveling, the occupant can easily understand by seeing the assistance image 26 that there are empty parking spaces 23. This allows the occupant to take actions to park in an empty parking space 23.

Next, with reference to FIG. 3B, description will be made for the case where the speed of the host vehicle 22 is 0 km/h. In the case where the sensor-information processing unit 104 detects empty parking spaces 23 around the host vehicle 22 as illustrated in FIG. 3B, the speed determination unit 106 determines whether the host vehicle 22 is at a standstill. Specifically, the speed determination unit 106 determines whether the speed of the host vehicle 22 is 0 km/h. If the speed of the host vehicle 22 is 0 km/h, the speed determination unit 106 determines that the host vehicle 22 is at a standstill.

Figure 3B:
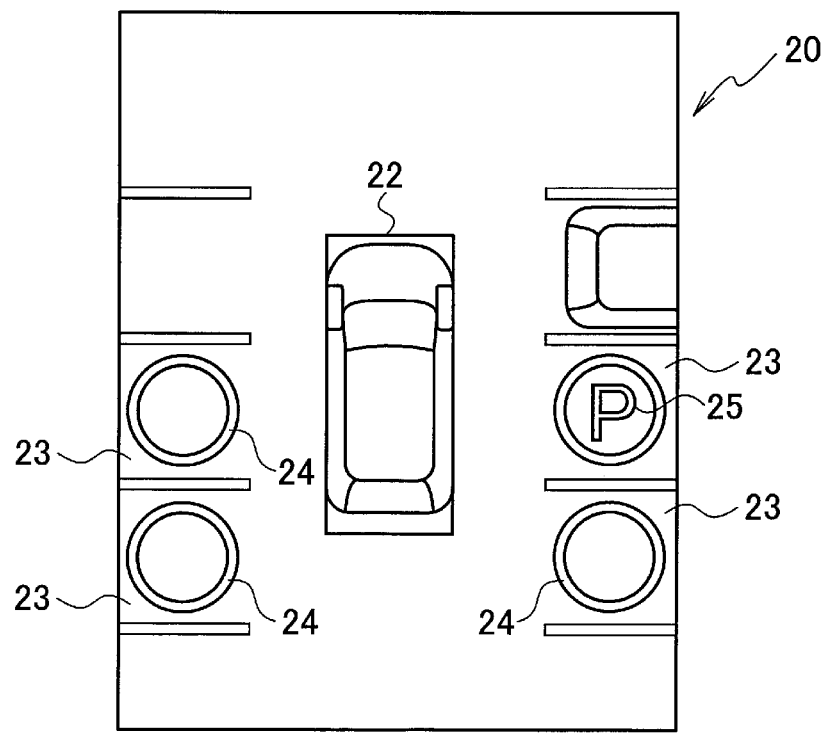
FIG. 3B is a diagram for explaining another operation example of the parking assistance device according to the embodiment of the present invention.

In the case where the speed determination unit 106 determines that the host vehicle 22 is at a standstill as illustrated in FIG. 3B, the image composition unit 1023 superimposes an assistance image 24 or assistance image 25 (a first assistance image) on each empty parking space 23. The assistance image 24 and the assistance image 25 are images indicating that the parking space is empty. Note that the assistance image 25 shows that the parking space is empty and that this place is a recommended parking space. The recommended parking space means, for example, a space that is easy to park in. The recommended parking space may be a space that requires a shorter time to park there or may be a space the parking trajectory to which is short. In addition, the recommended parking space may also be a space the parking trajectory to which includes no sharp turn, a space into which reverse parking is possible, or a space that is easy to exit from. The assistance image 24 only indicates that the parking space is empty.

Since the assistance image 24 or the assistance image 25 is displayed at an appropriate position at the empty parking space 23 as described above while the host vehicle 22 is at a standstill, the occupant can easily understand that the empty parking spaces 23 are empty. This allows the occupant to take actions to park in a desired empty parking space. In addition, for example, in the case where automatic parking control is available as in the present embodiment, the occupant's touch on the assistance image 25 (recommended parking space) initiates parking control to the target parking position automatically.

Note that as illustrated in FIG. 3B, in the case where the host vehicle 22 is at a standstill, the image composition unit 1023 does not superimpose the assistance image 26 illustrated in FIG. 3A. This is because when the host vehicle 22 is at a standstill, the image composition unit 1023 superimposes the assistance images 24 and the assistance image 25 on the empty parking spaces 23, so that the occupant can easily understand that there are empty parking spaces 23, without an assistance image 26 superimposed. Note that it was stated that when the host vehicle 22 is at a standstill, the image composition unit 1023 does not superimpose the assistance image 26, but the present invention is not limited to this example. For example, the image composition unit 1023 may superimpose the assistance image 26, for example, with its color made fainter (by adjusting its transparency) or with its color changed (for example, from blue to gray).

Meanwhile, as illustrated in FIG. 3A, when the host vehicle 22 is traveling, the image composition unit 1023 does not superimpose the assistance image 24 or the assistance image 25 illustrated in FIG. 3B on the surrounding image 20. In other words, when the host vehicle 22 is traveling, the image composition unit 1023 prohibits the assistance image 24 or the assistance image 25 from being superimposed. The reason will be explained below.

First of all, description will be made of the order in which the image composition unit 1023 superimposes the assistance image 24 or the assistance image 25 on an empty parking space 23. First, the image composition unit 1023 recognizes empty parking spaces 23 in the surrounding image 20. Next, the image composition unit 1023 superimposes the assistance images 24 and the assistance image 25 on the recognized empty parking spaces 23. If the host vehicle 22 moves while the image composition unit 1023 is performing such processes, the empty parking spaces 23 in the surrounding image 20 that the image composition unit 1023 has recognized also move. Specifically, the image composition unit 1023 recognizes the empty parking spaces 23, and at the next moment when the image composition unit 1023 is about to superimpose the assistance images 24 and the assistance image 25 on the recognized empty parking spaces 23, the empty parking spaces 23 have already moved from the positions when they were recognized. As above, a time lag occurs between the time when the image composition unit 1023 recognizes the empty parking spaces 23 and the time when the image composition unit 1023 superimposes the assistance images 24 and the assistance image 25 on the recognized empty parking spaces 23. This time lag may cause positional deviation between the positions of the empty parking spaces 23 and the positions of the assistance images 24 and the assistance image 25. Specifically, in the case where the image composition unit 1023 superimposes the assistance images 24 and the assistance image 25 on the empty parking spaces 23 in the surrounding image 20 while the host vehicle 22 is traveling, it is possible that the assistance images 24 and the assistance image 25 cannot be superimposed at appropriate positions. Note that such positional deviation becomes larger as the speed of the host vehicle 22 increases.

In light of the above, in the present embodiment, when the host vehicle 22 is traveling, the image composition unit 1023 does not display the assistance image 24 or the assistance image 25 at the empty parking spaces 23. This prevents positional deviation between the positions of the empty parking spaces 23 and the positions of the assistance images 24 and the assistance image 25. Thus, the parking assistance device prevents providing uncertain information to the occupant. Note that when the host vehicle 22 is traveling, the image composition unit 1023 superimposes the assistance image 26 at a position different from the empty parking spaces 23, instead of displaying the assistance images 24 and the assistance image 25 at the empty parking spaces 23 as illustrated in FIG. 3A. This allows the occupant to understand that there are empty parking spaces 23 by seeing the assistance image 26. Since the assistance image 26 is displayed at a position different from the empty parking spaces 23, the image composition unit 1023 does not need to take the foregoing time lag into an account.

When the host vehicle 22 is at a standstill, the image composition unit 1023 displays the assistance images 24 and the assistance image 25 at the empty parking spaces 23 as illustrated in FIG. 3B. Since the host vehicle 22 is at a standstill, the foregoing time lag does not occur, and thus, positional deviation does not occur between the positions of the parking spaces 23 and the positions of the assistance images 24 and the assistance image 25. Since the image composition unit 1023 displays the assistance images 24 and the assistance image 25 at the empty parking space 23 when the host vehicle 22 is at a standstill, the image composition unit 1023 can display the assistance images 24 and the assistance image 25 at appropriate positions.

After the image composition unit 1023 displays the assistance images 24 and the assistance image 25 at the positions of the empty parking spaces 23, the image composition unit 1023 keeps displaying the assistance images 24 and the assistance image 25 until the speed of the host vehicle 22 becomes higher than or equal to a specified speed. Thus, the occupant can select a desired empty parking space until the speed of the host vehicle 22 becomes higher than or equal to a specified speed.

The reason why the image composition unit 1023 keeps displaying the assistance images 24 and the assistance image 25 until the speed of the host vehicle 22 becomes higher than or equal to a specified speed is that positional deviation between the positions of the empty parking spaces 23 and the positions of the assistance images 24 and the assistance image 25 is suppressed until the speed of the host vehicle 22 becomes higher than or equal to the specified speed. In other words, until the speed of the host vehicle 22 becomes higher than or equal to the specified speed, the image composition unit 1023 can track the empty parking spaces 23 accurately.

The image composition unit 1023 can track position data indicating the empty parking spaces 23 as time series data. The position data indicating the empty parking spaces 23 is stored on a map. When the host vehicle 22 is at a standstill, the image composition unit 1023 can obtain the position data indicating the empty parking spaces 23 accurately, compared to the time when the host vehicle 22 is traveling. Thus, the image composition unit 1023 can accurately display the assistance images 24 and the assistance image 25, having the positional relationship relative to the positions indicating the empty parking spaces 23, at the empty parking spaces 23. After that, when the host vehicle 22 starts moving from its standstill state, the image composition unit 1023 can track the empty parking spaces 23 accurately by moving the host vehicle 22 on the map according to the movement of the host vehicle 22. Thus, the image composition unit 1023 can display the assistance images 24 and the assistance image 25 accurately at the empty parking spaces 23. However, in the case where errors are accumulated, such as measurement errors of the wheel speed sensor 6, self-position estimation errors of the odometry, and errors in detecting the empty parking spaces 23, the foregoing positional deviation may occur. Hence, when the speed of the host vehicle 22 is higher than or equal to a specified speed, the image composition unit 1023 does not display the assistance image 24 or the assistance image 25. Thus, the image composition unit 1023 prevents providing uncertain information to the occupant. Note that the foregoing map data may be stored in advance in the parking assistance device or may be obtained from an external map data server through cloud computing. Alternatively, the image composition unit 1023 may obtain map data through inter-vehicle communication or road-vehicle communication. Note that although the specified speed is not limited to any specific speed, it can be, for example, 3 km/h to 5 km/h.

Figure 4A:
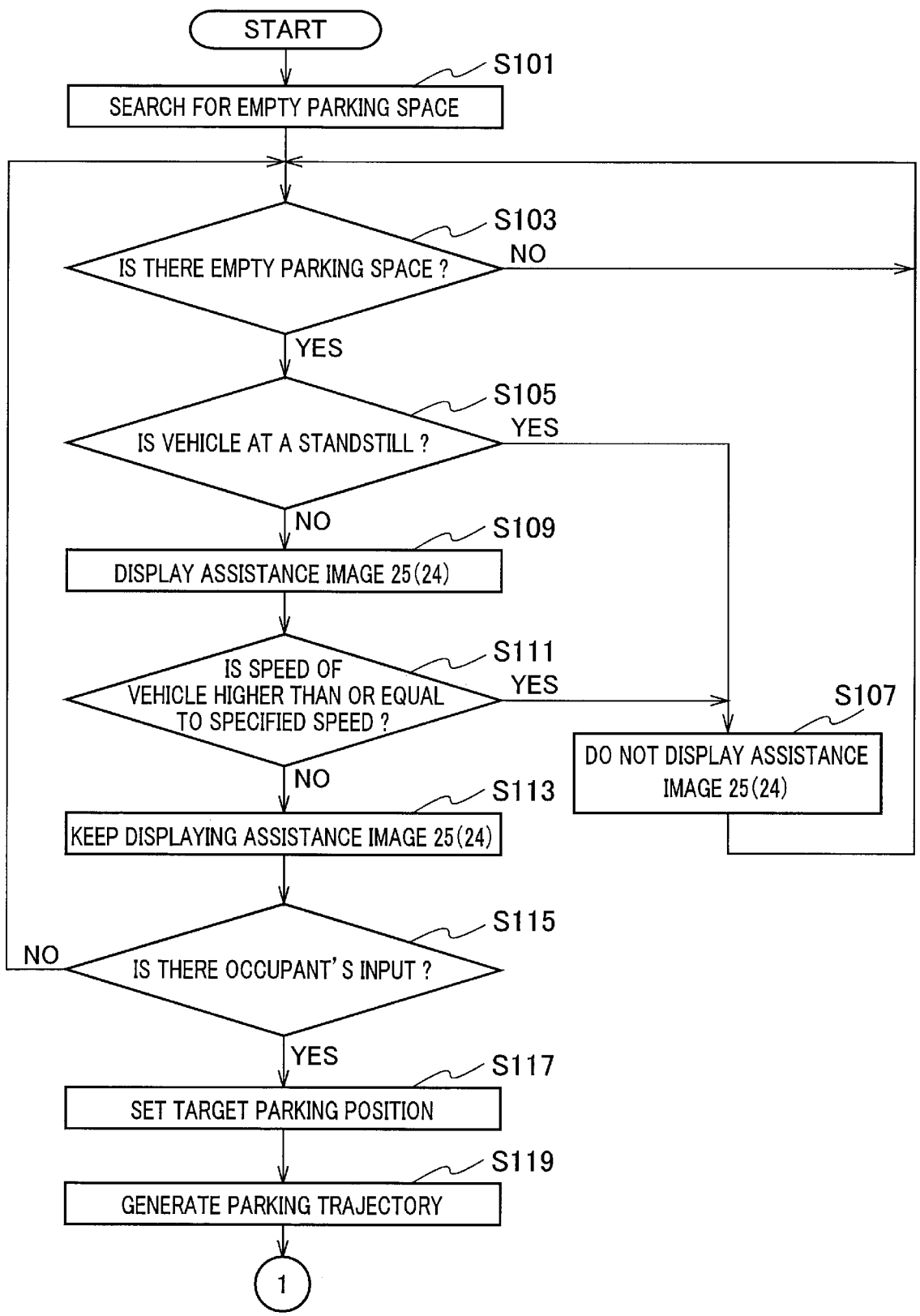
FIG. 4A is a flowchart for explaining an operation example of the parking assistance device according to the embodiment of the present invention.
Figure 4B:
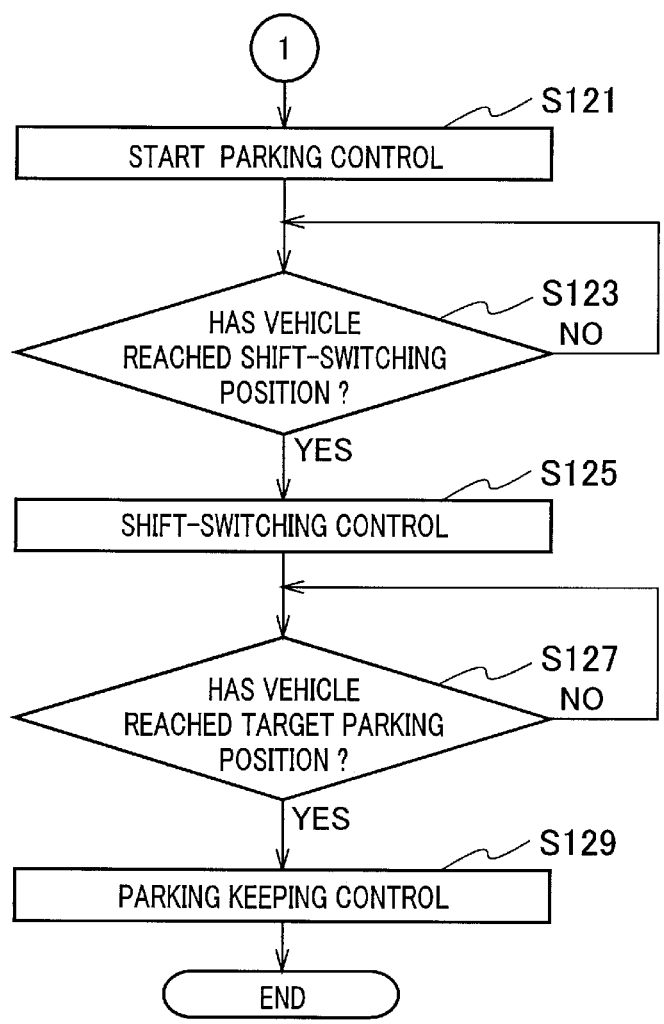
FIG. 4B is a flowchart for explaining an operation example of the parking assistance device according to the embodiment of the present invention.

Next, an operation example will be described with reference to the flowchart in FIG. 4.

At step S101, the sensor-information processing unit 104 detects empty parking spaces based on information obtained from the spatial recognition sensor 7. The process proceeds to step S103, at which if the sensor-information processing unit 104 detects an empty parking space around the host vehicle 22 (Yes at step S103), the process proceeds to step S105. At step S103, if the sensor-information processing unit 104 does not detect an empty parking space around the host vehicle 22 (No at step S103), the process keeps waiting.

At step S105 the speed determination unit 106 determines whether the speed of the host vehicle 22 is 0 km/h in order to determine whether the host vehicle 22 is at a standstill. If the speed determination unit 106 determines that the host vehicle 22 is not at a standstill (No at step S105), the process proceeds to step S107, and accordingly the image composition unit 1023 does not superimpose the assistance image 24 or the assistance image 25 at the empty parking space 23. The reason is that positional deviation may occur between the position of the empty parking space 23 and the position of the assistance image 24 or the assistance image 25 in the case where the image composition unit 1023 displays the assistance image 24 or the assistance image 25 at the empty parking space 23 while the host vehicle 22 is traveling.

On the other hand, if the speed determination unit 106 determines that the host vehicle 22 is at a standstill (Yes at step S105), the process proceeds to step S109, where the image composition unit 1023 displays the assistance image 24 or the assistance image 25 at the empty parking space 23, as illustrated in FIG. 3B. Since the host vehicle 22 is at a standstill, a time lag does not occur, and thus, positional deviation does not occur between the position of the parking space 23 and the position of the assistance image 24 or the assistance image 25. This allows the image composition unit 1023 to superimpose the assistance image 24 or the assistance image 25 at an appropriate position.

The process proceeds to step S111, where the speed determination unit 106 determines whether the speed of the host vehicle 22 is higher than or equal to a specified speed. If the speed of the host vehicle 22 is lower than the specified speed (No at step S111), the process proceeds to step S113, where the image composition unit 1023 keeps displaying the assistance image 24 or the assistance image 25. This is because the image composition unit 1023 can track the empty parking space 23 accurately until the speed of the host vehicle 22 becomes higher than or equal to the specified speed, which suppresses positional deviation between the positions of the parking space 23 and the position of the assistance image 24 or the assistance image 25. On the other hand, if the speed of the host vehicle 22 is higher than or equal to the specified speed (Yes at step S111), the process proceeds to step S107, where the image composition unit 1023 does not display the assistance image 24 or the assistance image 25 at the empty parking space. This is because when the speed of the host vehicle 22 is higher than or equal to the specified speed, errors are accumulated, such as measurement errors of the wheel speed sensor 6, self-position estimation errors of the odometry, errors in detecting the empty parking space 23, so that positional deviation may occur between the position of the parking space 23 and the position of the assistance image 24 or the assistance image 25.

The process proceeds to step S115, where if the occupant selects a desired empty parking space via the input interface 8 (Yes at step S115), the process proceeds to step S117. On the other hand, if there is no input from the occupant, the process returns to step S103.

At step S117, the target-parking-spot setting unit 1051 sets the target parking position to the empty parking space selected by the occupant. The parking-start-position setting unit 1052 determines the parking method and sets a parking start position suitable for the determined parking method. Note that in this flowchart, description is made assuming that the parking method is reverse parking. After that, the process proceeds to step S119, where the parking-trajectory generation unit 1054 generates a parking trajectory from the parking start position set at step S117 to the target parking position. Next, the process proceeds to step S121, where the vehicle control ECU10 starts the automatic parking control.

Next, the process proceeds to step S123, where the self-position estimation unit 1053 determines whether the host vehicle 22 has reached the position at which the shift position is to be switched. If the host vehicle 22 has reached the position at which the shift position is to be switched (Yes at step S123), the process proceeds to step S125, where the vehicle control ECU10 performs shift switching control. After that, the vehicle control ECU10 continues the automatic parking control, and the process proceeds to step S127. On the other hand, if the host vehicle 22 has not reached the position at which the shift position is to be switched (No at step S123), the process keeps waiting. At step S127, the self-position estimation unit 1053 determines whether the host vehicle 22 has reached the target parking position. If the host vehicle 22 has reached the target parking position (Yes at step S127), the process proceeds to step S129, where the vehicle control ECU10 performs control such as changing the shift position to the parking position, and then the automatic parking control ends.

(Operational Advantage)

As has been described above, the parking assistance device according to the present embodiment provides the following operational advantages.

When the sensor-information processing unit 104 has detected an empty parking space 23 around the host vehicle 22, the speed determination unit 106 determines whether the host vehicle 22 is at a standstill. If the speed determination unit 106 determines that the host vehicle 22 is at a standstill, the image composition unit 1023 displays the assistance image 24 or the assistance image 25, indicating that the parking space is empty, at the position of the empty parking space 23 in the surrounding image 20, as illustrated in FIG. 3B. Then, the image composition unit 1023 displays the composed image on the display 9. When the host vehicle 22 is at a standstill, no time lag occurs, and thus, no positional deviation occurs between the position of the parking space 23 and the position of the assistance image 24 or the assistance image 25. In this way, the parking assistance device can display the assistance image 24 or the assistance image 25 at an appropriate position.

In the case where the speed of the host vehicle 22 is 0 km/h, the speed determination unit 106 determines that the host vehicle 22 is at a standstill. The determination in this way allows the speed determination unit 106 to determine swiftly that the host vehicle 22 is at a standstill.

After the image composition unit 1023 displays the assistance image 24 or the assistance image 25, the image composition unit 1023 keeps displaying the assistance image 24 or the assistance image 25 until the speed of the host vehicle 22 becomes higher than or equal to a specified speed. This is because the image composition unit 1023 can track the empty parking space 23 accurately until the speed of the host vehicle 22 becomes higher than or equal to the specified speed, which prevents positional deviation between the position of the parking space 23 and the position of the assistance image 24 or the assistance image 25.

After the image composition unit 1023 displays the assistance image 24 or the assistance image 25, in the case where the speed of the host vehicle 22 becomes higher than or equal to the specified speed, the image composition unit 1023 prohibits the assistance image 24 or the assistance image 25 from being displayed. This is because when the speed of the host vehicle 22 is higher than or equal to the specified speed, errors are accumulated, such as measurement errors of the wheel speed sensor 6, self-position estimation errors of the odometry, and errors in detecting the empty parking space 23, so that positional deviation may occur between the position of the parking space 23 and the position of the assistance image 24 or the assistance image 25. Since the image composition unit 1023 prohibits the assistance image 24 or the assistance image 25 from being displayed, it is possible to prevent providing uncertain information to the occupant.

When the host vehicle 22 is not at a standstill, in other words, when the host vehicle 22 is traveling, the image composition unit 1023 displays the assistance image 26 at a fixed position different from the position of the empty parking space 23 as illustrated in FIG. 3A. This allows the occupant to easily understand that there is an empty parking spaces 23.

In the case where the host vehicle 22 stops while the assistance image 26 is displayed as illustrated in FIG. 3A, the image composition unit 1023 switches the display from the assistance image 26 to the assistance image 24 or the assistance image 25 as illustrated in FIG. 3B. This allows the occupant to easily understand the position of the empty parking space 23.

When the host vehicle 22 is not at a standstill, the image composition unit 1023 prohibits the assistance image 24 or the assistance image 25 from being displayed. This is because positional deviation may occur between the position of the empty parking space 23 and the position of the assistance image 24 or the assistance image 25 in the case where the image composition unit 1023 displays the assistance image 24 or the assistance image 25 at the empty parking space 23 while the host vehicle 22 is traveling. Since the image composition unit 1023 prohibits the assistance image 24 or the assistance image 25 from being displayed, it is possible to prevent providing uncertain information to the occupant.

Other Embodiments

Although an embodiment of the present invention has been described as above, it should not be understood that the descriptions and drawings constituting part of this disclosure limit this invention. From this disclosure, various alternative embodiments, examples, and operational techniques will be apparent to those skilled in the art.

Although in the present embodiment, the assistance image 26 illustrated in FIG. 3A is represented in a quadrangle shape, and the assistance image 24 and the assistance image 25 illustrated in FIG. 3B are each represented in a round shape, the shapes are not limited to these examples. The assistance image 26, the assistance image 24, and the assistance image 25 may have any shape that can be distinguished one from the others.

Although in the present embodiment, the speed determination unit 106 determines that the host vehicle 22 is at a standstill in the case where the speed of the host vehicle 22 is 0 km/h, the present invention is not limited to this operation. It is not always true that when the speed of the host vehicle 22 is 0 km/h, the host vehicle 22 is at a standstill. For example, even when the occupant steps on the brake pedal, and the speed of the host vehicle 22 has become 0 km/h, there is a possibility that the host vehicle 22 may be slipping when the ground is wet or when the tires are worn. In other words, even when the speed meter indicates 0 km/h, the speed detected by the wheel speed sensor 6 is not always 0 km/h. Accordingly, the speed determination unit 106 may set a margin and determine that the host vehicle 22 has stopped when the speed of the host vehicle 22 is lower than or equal to a specified speed. The determination in this way allows the speed determination unit 106 to determine in various road environments whether the host vehicle 22 is at a standstill.

Here, the speed determination unit 106 may determine whether the parking brake of the host vehicle 22 is applied and may determine that the host vehicle 22 is at a standstill when the parking brake is applied. The determination in this way allows the speed determination unit 106 to determine in various road environments whether the host vehicle 22 is at a standstill. Here, the parking brake referred to above includes a hand brake and a foot brake.

As an alternative, the speed determination unit 106 may determine whether the shift lever of the host vehicle 22 is at the park position and determine that the host vehicle 22 is at a standstill when the shift lever is at the park position. The determination in this way allows the speed determination unit 106 to determine in various road environments whether the host vehicle 22 is at a standstill. Although in this example, it is determined whether the shift lever is at the park position, it may be determined in this determination that the shift lever is at the park position in the case where the parking button for moving into the parking mode is pressed and the vehicle has been put into the parking mode.

Alternatively, the speed determination unit 106 may determine whether the speed of the host vehicle is lower than or equal to a specified speed (for example, 5 km/h or less) set in advance and may determine that the host vehicle is at a standstill when it is determined that the vehicle speed is lower than or equal to the specified speed. The determination in this way allows the speed determination unit 106 to display the first assistance image when the speed becomes lower than or equal to the specified speed even before the host vehicle stops. Thus, it is possible to display the first assistance image for the occupant at an appropriate timing.

As an alternative, the speed determination unit 106 may determine whether the speed of the host vehicle is lower than or equal to a specified speed (for example, 5 km/h or less) set in advance and, in the case where it is determined that the vehicle speed is lower than or equal to the specified speed, may determine whether deceleration operation is being performed in the host vehicle. In the case where it is determined that deceleration operation is being performed, the speed determination unit 106 may estimate that the host vehicle is stopping and determine that the host vehicle has stopped. The determination in this way allows the speed determination unit 106 to display the first assistance image in the case where deceleration operation is performed at a speed lower than or equal to the specified speed even before the host vehicle stops. Thus, it is possible to display the first assistance image for the occupant at an appropriate timing. Note that the deceleration operation in the present embodiment means the state where the brake actuator is operating and thus includes not only operation of the brake actuator by the occupant but also the case where the brake actuator is operating without the occupant' operation.

Note that in the present embodiment, the driving mode at the time when the sensor-information processing unit 104 detects an empty parking space may be either manual driving by the occupant or automated driving.

REFERENCE SIGNS LIST

1 controller
2a to 2d camera
3 steering angle sensor
6 wheel speed sensor
7 spatial recognition sensor
8 input interface
9 display
10 vehicle control ECU
11 actuator
101 surrounding-image generation unit
102 composite-image generation unit
103 icon storing unit
104 sensor-information processing unit
105 parking-assistance calculation unit
106 speed determination unit
1021 assistance-image generation unit
1022 display-switching control unit
1023 image composition unit

The invention claimed is:

1. A parking assistance method for a parking assistance device that is capable of detecting an empty parking space around a host vehicle and is capable of displaying a first assistance icon at a position of the empty parking space in a surrounding image that is a view of an area including the host vehicle from above, the first assistance icon indicating the empty parking space, the parking assistance method comprising:
   detecting the empty parking space;
   when detecting the empty parking space, determining whether the host vehicle has stopped;
   determining whether or not to superimpose the first assistance icon at the position of the empty parking space in the surrounding image based on whether the host vehicle has stopped;
   when determining that the host vehicle is stopped, displaying the surrounding image with the first assistance icon superimposed on the surrounding image at the position of the empty parking space;
   after starting display of the first assistance icon, causing the first assistance icon to remain displayed until a speed of the host vehicle becomes greater than or equal to a specified speed;
   terminating the display of the first assistance icon when the speed of the host vehicle becomes greater than or equal to the specified speed, wherein the specified speed is a speed at which a positional deviation is prevented, the position deviation being between the position of the empty parking space and a position of the first assistance icon due to at least one of a measurement error of a wheel speed sensor of the host vehicle, a self-position estimation error of an odometry of the host vehicle, or an error in detecting the empty parking space;
   prior to terminating the display of the first assistance icon, when an occupant of the host vehicle selects the empty parking space indicated by the first assistance icon via an input interface, setting a target parking position to the empty parking space selected by the occupant;
   generating a parking trajectory from a parking start position to the target parking position; and
   starting an automatic parking control along the generated parking trajectory.

2. The parking assistance method according to claim 1, further comprising:
   determining whether to superimpose a second assistance icon indicating that the empty parking space has been detected on the surrounding image based on whether the host vehicle has stopped; and
   when determining that the host vehicle is not stopped, displaying the surrounding image with the second assistance icon superimposed on the surrounding image at a position different from the position of the empty parking space without the first assistance icon superimposed on the surrounding image.

3. The parking assistance method according to claim 2, further comprising:
   when the host vehicle stops while the second assistance icon is superimposed on the surrounding image, switching the superimposing so that the first assistance icon is superimposed instead of the second assistance icon.

4. The parking assistance method according to claim 2, wherein the position that the second assistance icon is superimposed on the surrounding image is preset.

5. The parking assistance method according to claim 2, wherein the position that the second assistance icon is superimposed is near a top of the surrounding image.

6. The parking assistance method according to claim 2, wherein the first assistance icon is displayed in a circle when the first assistance icon is superimposed on the surrounding image, and the second assistance icon is displayed in a quadrangle when the second assistance icon is superimposed on the surrounding image.

7. The parking assistance method according to claim 2, further comprising:
   adjusting a transparency of the second assistance icon when the host vehicle transitions from a non-stationary state to a stationary state.

8. The parking assistance method according to claim 1, wherein determining that the host vehicle has stopped comprises determining that the speed of the host vehicle is zero.

9. The parking assistance method according to claim 1, wherein determining that the host vehicle has stopped comprises determining that a parking brake of the host vehicle is applied.

10. The parking assistance method according to claim 1, wherein determining that the host vehicle has stopped comprises determining that
    a shift lever of the host vehicle is at a park position.

11. The parking assistance method according to claim 1, wherein determining that the host vehicle has stopped comprises determining that the
    speed of the host vehicle is lower than the specified speed.

12. The parking assistance method according to claim 1, wherein determining that the host vehicle has stopped comprises:
- determining whether the speed of the host vehicle is lower than the specified speed;
- when determining that the speed of the host vehicle is lower than the specified speed, determining whether a deceleration operation is being performed in the host vehicle; and
- when determining that the deceleration operation is being performed, determining that the host vehicle has stopped.

13. The parking assistance method according to claim 1, wherein the surrounding image is displayed with the first assistance icon is-superimposed on the surrounding image at the position of the empty parking space in the surrounding image when the host vehicle is stopped, and the surrounding image is displayed without the first assistance icon superimposed on the surrounding image at the position of the empty parking space when the host vehicle is not stopped.

14. The parking assistance method according to claim 13, further comprising:
- prohibiting superimposing of the first assistance icon on the surrounding image at the position of the empty parking space in the surrounding image when the host vehicle is traveling.

15. The parking assistance method according to claim 14, further comprising:
- displaying the surrounding image with a second assistance icon superimposed on the surrounding image at a position different from the position of the empty parking space when superimposing of the first assistance icon on the surrounding image is prohibited.

16. The parking assistance method according to claim 1, further comprising:
- when the empty parking space is detected and the host vehicle has not stopped, displaying the surrounding image with a second assistance icon superimposed on the surrounding image at a position different from the position of the empty parking space in the surrounding image, wherein the second assistance icon indicates that the empty parking space has been detected.

17. The parking assistance method according to claim 1, further comprising:
- prohibiting superimposing of the first assistance icon on the surrounding image at the position of the empty parking space in the surrounding image when the host vehicle is not stopped.

18. A parking assistance device comprising:
- a sensor-information processing circuit configured to detect an empty parking space around a host vehicle;
- a surrounding-image generation circuit that generates a surrounding image that is a view of surroundings of the host vehicle from above;
- an image display circuit configured to display the surrounding image with a first assistance icon superimposed on the surrounding image at a position of the empty parking space in the surrounding image, the first assistance icon indicating the empty parking space; and
- a stop determination circuit that determines whether the host vehicle has stopped,
- wherein when the empty parking space is detected by the sensor-information processing circuit, the stop determination circuit determines whether the host vehicle has stopped,
- a determination is made as to whether to superimpose the first assistance icon on the surrounding image at the position of the empty parking space in the surrounding image based on whether the host vehicle has stopped,
- when the stop determination circuit determines that the host vehicle is stopped, the image display circuit displays the surrounding image with the first assistance icon superimposed on the surrounding image at the position of the empty parking space, and
- when the stop determination circuit determines that the host vehicle is not stopped, the image display circuit displays the surrounding image without the first assistance icon superimposed on the surrounding image,
- after starting display of the first assistance icon, the image display circuit continues to display the first assistance icon until a speed of the host vehicle becomes greater than or equal to a specified speed and terminates the display of the first assistance icon when the speed becomes greater than or equal to the specified speed, wherein the specified speed is a speed at which a positional deviation is prevented, the position deviation being between the position of the empty parking space and a position of the first assistance icon due to at least one of a measurement error of a wheel speed sensor of the host vehicle, a self-position estimation error of an odometry of the host vehicle, or an error in detecting the empty parking space.

* * * * *